United States Patent
Bolton et al.

[11] Patent Number: 6,046,301
[45] Date of Patent: Apr. 4, 2000

[54] POLYCARBONATE COMPOSITIONS HAVING REDUCED TENDENCY TO SPLAY

[75] Inventors: Daniel H. Bolton, Beaver Falls; Sivaram Krishnan, Pittsburgh; Jon M. Newcome, Aliquippa, all of Pa.; Jeffrey M. Tennant, New Cumberland, W. Va.; David M. Derikart, Natrona Heights; Ramesh M. Pisipati, Wexford, both of Pa.; Wolfgang Ebert, Krefeld, Germany

[73] Assignees: Bayer Corporation, Pittsburgh, Pa.; Bayer Aktiengesellschaft, Leverkusen, Germany

[21] Appl. No.: 09/290,906

[22] Filed: Apr. 12, 1999

[51] Int. Cl.$^7$ ..................................................... C08G 64/00
[52] U.S. Cl. ............................................. 528/198; 528/196
[58] Field of Search .................................. 528/176, 196, 528/198

[56] References Cited

U.S. PATENT DOCUMENTS 5,145,751  9/1992  Kanai ...................................... 428/694

*Primary Examiner*—Terressa M. Boykin
*Attorney, Agent, or Firm*—Joseph C. Gil; Aron Preis

[57] ABSTRACT

A transparent thermoplastic molding composition having good release properties is disclosed. The composition which contains no magnetic elements contains a polycarbonate resin and 0.01 to 0.3 percent by weight of a mold release agent. The agent is the product of a reaction of a compound represented by formula (I)

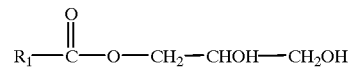

where $R_1$ denotes a $C_{1-30}$-alkyl group, with at least one member selected from the group consisting of (i)

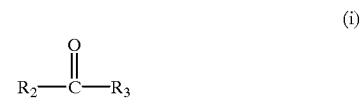

where $R_2$ and $R_3$ independently denote $C_{1-30}$- alkyl or an aryl group, and (ii)

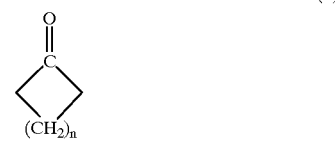

where n is 1–7.

10 Claims, No Drawings

POLYCARBONATE COMPOSITIONS HAVING REDUCED TENDENCY TO SPLAY

The invention is directed to transparent thermoplastic molding compositions and more particularly to polycarbonate molding compositions having good mold release properties.

SUMMARY OF THE INVENTION

A thermoplastic polycarbonate molding composition having good release properties and improved thermal stability is disclosed. Particularly suitable for the manufacture of optical storage devices, the composition which is characterized in the absence of magnetic elements therefrom, contains as a mold release agent the product of a reaction between

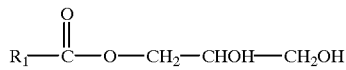

where $R_1$ denotes a $C_{1-30}$-alkyl group, with at least one member selected from the group consisting of (i)

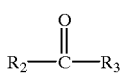

where $R_2$ and $R_3$ independently denote $C_{1-30}$- alkyl or an aryl group, and (ii)

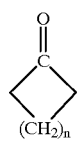

where n is 1–7.

BACKGROUND OF THE INVENTION

Glycerol monostearate (GMS) is known for its efficacy as a mold release agent for thermoplastic polycarbonate molding compositions. It has, however, been observed by the art-skilled that molecular weight degradation of polycarbonate, a result of transesterification with GMS, represents a drawback to the use of this mold release agent. Under the thermal conditions prevailing during molding the product of transesterification, GMS-carbonate, decomposes to yield carbon dioxide, which causes the molding defect known as splay. This defect is of major concern for the producers of optical storage devices, such as optical discs, not only because of the aesthetics aspect but also from the standpoint of replication of the imbedded information. The present invention addresses the above problem.

A compound conforming structurally to the inventive mold release agent has been disclosed in U.S. Pat. No. 5,145,751. The '751 document disclosed a magnetic recording medium which includes a non-magnetic substrate and a magnetic recording layer coated on the substrate. The layer comprises a compound embracing the present release agent.

DETAILED DESCRIPTION OF THE INVENTION

The thermoplastic composition in accordance with the present invention is characterized by the absence of magnetic elements therefrom and comprise a polycarbonate resin and about 0.01 to 0.3 percent, preferably 0.03 to 0.1 percent, relative to the weight of the polycarbonate, of a mold release agent.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 15,000 to 22,000 and their melt flow rate, per ASTM D-1238 at 300° C., is about 1 to about 95 g/10 min., preferably about 60 to 90 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

(1)

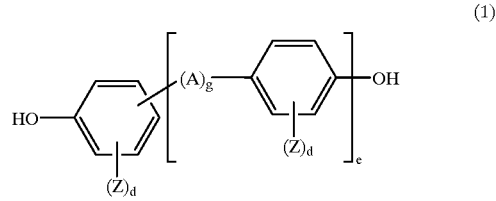

(2)

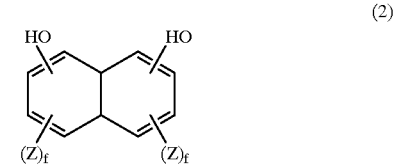

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

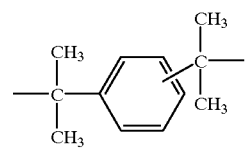

e and g both denote the number 0 to 1;
Z denotes F, Cl, Br or $C_1$–$C_4$-alkyl and if several Z radicals are substituents in one aryl radical, they may be identical or different from one another;
d denotes an integer from 0 to 4; and
f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α,α-bis- (hydroxyphenyl)-diisopropyl-benzenes, as well as their nuclear-alkylated compounds. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenol-phthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxy compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24,13 to 16, 7.5 to 13.0 and 3.5 to 6.5 g/10 min., respectively. Especially suitable are Makrolon CD 2005 and Makrolon DP1-1265, having MFR values of 60 to 70 and 70 to 90 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The mold release agent in the context of the invention is the product of a reaction of a compound represented by formula (I)

where $R_1$ denotes a $C_{1-30}$-alkyl group, preferably $C_{4-25}$-alkyl group, more preferably $C_{14-20}$-alkyl group, with at least one member selected from the group consisting of

where $R_2$ and $R_3$ independently denote $C_{1-30}$-alkyl, preferably $C_{4-25}$-alkyl group, more preferably $C_{14-20}$-alkyl group or an aryl group, and

where n is 1–7, preferably 2–5.

Preferably, the mold release agent conforms to formula (III) or (IV)

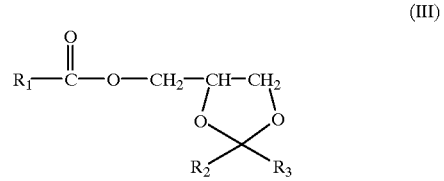

-continued

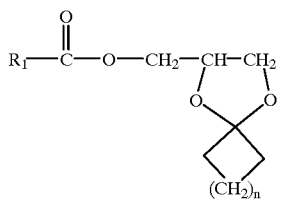

(IV)

where $R_1$, $R_2$, and $R_3$ independently are $C_{4-25}$-alkyl groups and n is 2–5.

The reaction and catalysts suitable therefore are described in Org. Synth. III, 502 (1955) which document is incorporated herein by reference.

The composition of the invention may contain conventional additives which are known for their art-recognized functions. These include dyes, flame-retardants and hydrolysis and UV stabilizers, plasticizers and mold release agents. In one preferred embodiment, the composition is suitable for making highly transparent optical storage devices. The molded articles for these devices are characterized in that their transparency determined in accordance with ASTM D 1003 measured on specimen 100 mils thick is at least 88%.

The preparation of the stabilized compositions of the invention is conventional.

Experimental

A mold release agent in accordance with the invention has been prepared and its efficacy determined.

The preparation of a mold release agent conforming structurally to formula (IV) above wherein $R_1$ is $C_{17}$-alkyl and n=3 is described below:

To a 250 mL round bottom flask equipped with a Dean Stark trap and a condenser, was added 10.22 g of glycerine monostearate, 75 mL of dry toluene, 0.09 g of p-toluenesulfonic acid monohydrate, and 4.0 mL of cyclohexanone. The reaction was allowed to reflux with stirring until the theoretical amount of water was collected (about 0.5 mL) via the Dean Stark trap. Once the reaction was complete, 2.0 mL of triethylamine was added and the toluene was removed by distillation. The residual molten material was added to 280 mL of methanol and allowed to cool slowly to room temperature to precipitate the reaction product. To ensure that all the material had precipitated, 70 mL of deionized water was added slowly. The precipitate was collected by vacuum filtration and dried under reduced pressure to yield 10.994 g of a white powder.

The preparation of the inventive composition:

The agent prepared in accordance with the procedure described above was incorporated in a bisphenol-A based homopolycarbonate resin having a weight average molecular weight of about 18,000 at an amount of 300 ppm and articles were molded conventionally. The agent was noted to have release properties corresponding to the ones of GMS. The splay count for optical discs prepared from the inventive composition was considerably lower than for discs using GMS in equivalent amount.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A transparent thermoplastic molding composition, containing no magnetic elements, comprising a polycarbonate resin and about 0.01 to 0.3 percent relative to the weight of the polycarbonate, of a mold release agent said agent comprising the product of a reaction of a compound represented by formula (I)

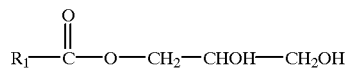

where $R_1$ denotes a $C_{1-30}$- alkyl group, with at least one member selected from the group consisting of (i)

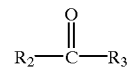

where $R_2$ and $R_3$ independently denote $C_{1-30}$- alkyl or an aryl group, and (ii)

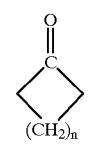

where n is 1–7.

2. The composition of claim I wherein said mold release agent is present in an amount of 0.03 to 0.1 percent relative to the weight of the polycarbonate.

3. The molding composition of claim 1 wherein said member is (i) and $R_1$ denotes a $C_{4-25}$-alkyl group.

4. The molding composition of claim 1 wherein said member is (i) and $R_2$ and $R_3$ independently denote $C_{4-25}$-alkyl groups.

5. The molding composition of claim 1 wherein said member is (i) and $R_1$ $R_2$ and $R_3$ independently denote $C_{14-20}$-alkyl groups.

6. The molding composition of claim 1 wherein said member is

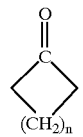

where n is 2–5.

7. The molding composition of claim 1 wherein said agent conforms to

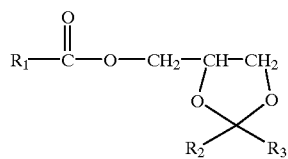

(III)

where $R_1$, $R_2$, and $R_3$ independently are $C_{4-25}$-alkyl groups.

8. The molding composition of claim 1 wherein said agent conforms to

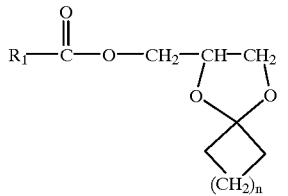

(IV)

where $R_1$ denotes a $C_{4-25}$-alkyl group and n is 2–5.

9. The molding composition of claim 2 wherein said agent conforms to

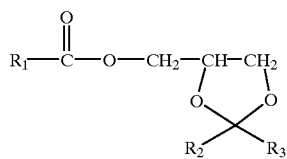

(III)

where $R_1$, $R_2$, and $R_3$ independently are $C_{4-25}$-alkyl groups.

10. The molding composition of claim 2 wherein said agent conforms to

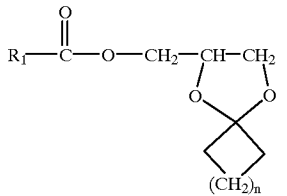

(IV)

where $R_1$ denotes a $C_{4-25}$-alkyl group and n is 2–5.

* * * * *